United States Patent Office 2,994,518
Patented Aug. 1, 1961

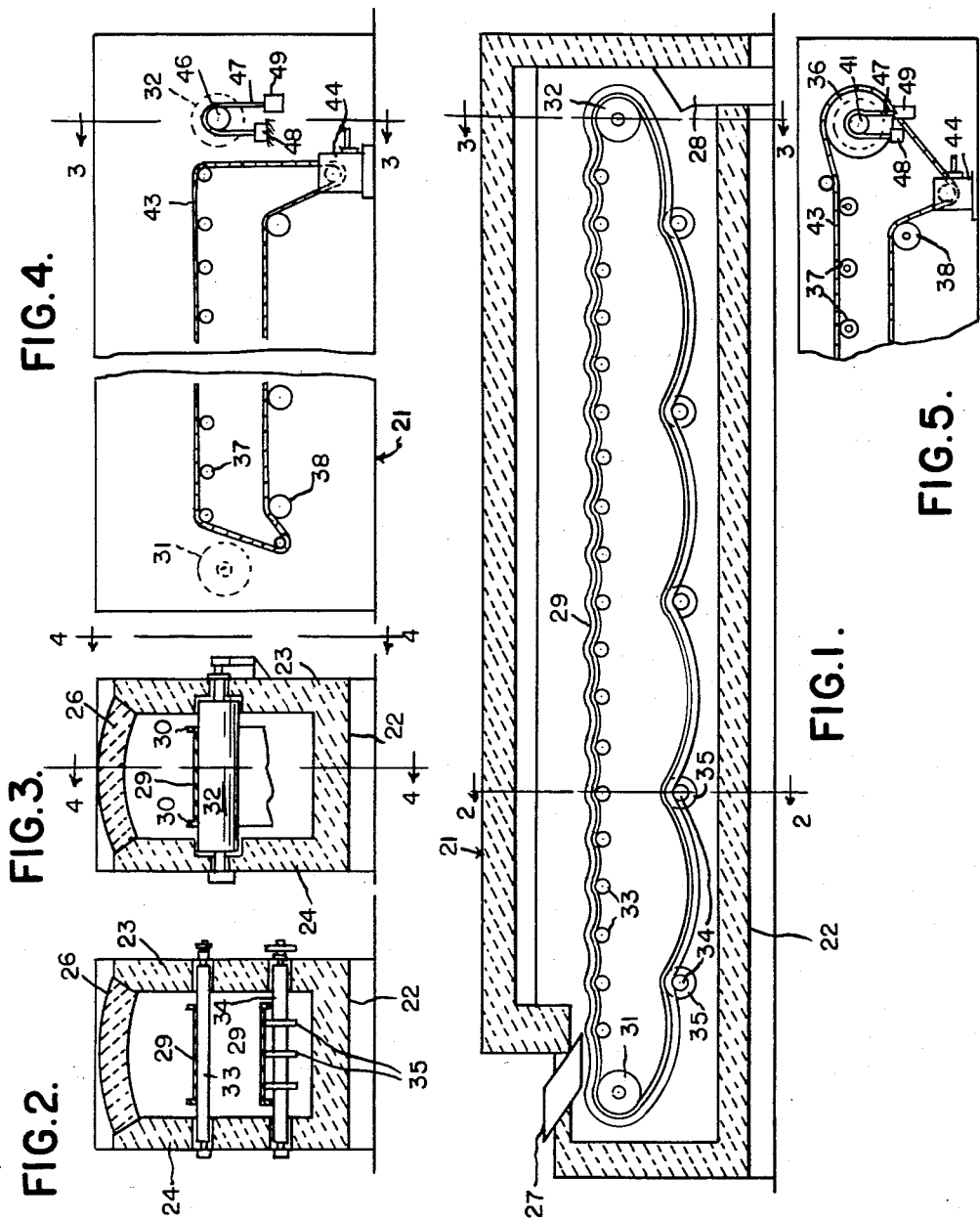

2,994,518
CONVEYOR DRIVING SYSTEM
Roland C. Crans, Detroit, Mich., assignor to Holcroft & Company, Detroit, Mich., a corporation of Michigan
Filed Dec. 10, 1958, Ser. No. 779,308
4 Claims. (Cl. 263—8)

This invention pertains to a conveyor driving system and more particularly to a system which introduces and maintains a distributed sag in the driven conveyor belt.

In a furnace conveyor having an endless conveyor belt which is passed about a pair of longitudinally spaced drums, a problem in the art has been to prevent belt accumulation at the discharge end of the belt which occurs after belt expansion due to the high furnace temperatures. One of the ways to solve this problem was to provide one or both of the drums with a movable axis which, during high furnace temperatures, was moved away from the opposite drum to take up any slack or belt accumulation. This required relatively expensive structure and, in addition, would place portions of the belt under substantially high tensile force so that a heavier, stronger belt was required.

This invention provides structure for distributing belt elongation between the drums so that take-up means become unnecessary and belt tension is substantially reduced so that a lighter, less expensive belt may be utilized.

The structure for doing this includes a series of spaced driven rollers for a return strand of the belt and the provision of a braking force to the drum at the discharge end which opposes belt travel. In this manner any belt accumulation tending to occur between the discharge end drum and the first return roller is prevented since the return rollers are driven and the drum is not.

It is, therefore, an object of this invention to prevent belt accumulation and to maintain a distributed belt sag.

It is another object of this invention to eliminate the need for belt take-up means in a furnace conveyor drive.

A further object of this invention is to reduce the maximum belt tension occurring at any point and at any time of belt operation so that the required belt thickness is reduced.

Another object of this invention is to provide in a furnace conveyor drive a pair of spaced drums about which the conveyor belt is passed with one drum at the receiving end of the belt and the other drum at the discharge end of the belt, and to provide a series of spaced driven rollers for the return strand of the belt and to further provide a continuous braking force to the discharge drum so that belt accumulation between the discharge drum and the nearest return roller is prevented and any belt expansion is distributed along the belt length.

It is a still further object to incorporate in a furnace conveyor belt a predetermined sag between supporting driven rollers and to maintain a belt sag between the supporting rollers and/or drums so that the maximum belt tension at any time is kept to a minimum in order to reduce belt thickness.

Additional objects and advantages will become more apparent when a description of a preferred embodiment is considered in connection with the drawings, in which:

FIG. 1 is a diagrammatic longitudinal section through a furnace chamber embodying the conveyor drive of this invention;

FIG. 2 is a section taken at 2—2 of FIG. 1 illustrating the mountings of the driven rollers for the upper and lower strands of the conveyor belt;

FIG. 3 is a section taken at 3—3 of FIG. 1 showing the discharge drum and the braking means attached at one end thereof; and FIG. 4 is a view taken in the direction of the arrows 4—4 of FIG. 3 showing the driving mechanism for the upper and lower rollers.

FIG. 5 is a view similar to a corresponding portion of FIG. 4 where the discharge end drum is driven through an overrunning clutch.

In the drawings is shown a furnace 21 having a base 22 attached to and supporting upstanding side walls 23, 24 which in turn support the arched top 26. Provided at one end of furnace 21 is a receiving chute 27 and at the other end a discharge chute 28. Materials used in the construction of the furnace are of the conventional nature and are chosen to withstand the furnace temperatures and to support the furnace conveyor system associated therewith and now to be described.

Journaled for rotation in each wall 23, 24 of the furnace are the ends of the longitudinally spaced drums 31, 32 and upper rollers 33 and lower rollers 34 about which belt 29 with retaining sides 30 is passed. Fixed to each roller 34 is a plurality of belt carrying discs 35 which provide clearance for sides 30. Attached to the ends of rollers 33, 34 exteriorly of wall 23 are sprockets 37 and 38 respectively with which are dimensioned corresponding to their respective belt carrying members.

In the modification of FIG. 5, the sprocket 36 is slightly oversize with respect to drum 32 and is connected thereto by means of an overrunning clutch 41 shown diagrammatically and which may be of similar construction to that disclosed and described in Patent No. 2,780,454 issued February 5, 1957, to Clarence H. Martin. Clutch 41 permits drum 32 to rotate faster than sprocket 36. Chain 43 engages and drives sprockets 36, 37 and 38 and is in turn driven by a motor 44. Since sprockets 37, 38 correspond to the diameter of their attached belt carrying members, the peripheral speed of rollers 33 and discs 35 will be equal.

Connected to an end of drum 32 exteriorly of wall 22 is a brake cylinder 46 about which is passed a brake band 47 fixed at one end to furnace wall 23 by means of lateral extension 48 and attached at the other end is a weight 49 which may be varied to give a desired braking effect. This, as will be appreciated, imparts a continuous braking force to the drum 32, which function may be provided by a number of other suitable conventional braking means.

As mentioned, conveyor belt 29 is passed about the upper rollers 33, drums 31, 32 and discs 35 of lower rollers 34 and is dimensioned so that a predetermined sag exists between the rollers and between the rollers and the drums. By introducing the sag, the amount of which will be a function of conveyor weight, load weight, roller spacing and furnace conditions, the belt tension is minimized.

In the operation of the conveyor drive shown in FIGURES 1–4, motor 44 drives chain 43 which in turn drives sprockets 37 and 38. This results in equal peripheral speeds of rollers 33 and discs 35 with drum 32 being belt driven and having the same or a lesser peripheral speed, depending on the braking effect of band 47.

The embodiment of FIG. 5 is especially adaptable to those situations where belt slippage is excessive, as in short conveyor systems. In the operation of the conveyor drive, motor 44 drives chain 43 which in turn drives sprockets 36, 37 and 38. This causes equal peripheral speed of rollers 33 and discs 35 and, when belt 29 is sufficiently loaded to prevent slippage, drum 32 will be belt driven at a peripheral speed depending on the braking imparted by brake belt 47 and if this speed is greater than the speed of the drive from sprocket 36, clutch 41 will overrun. However, when the load is lessened to a particular point, the belt will begin to slip and drum 32 will be driven through clutch 41 by sprocket 36 at a peripheral speed less than that of rollers 33 and discs

35. This, as fully explained in the above mentioned Martin patent, reduces the tension on the belt 29.

By providing an initial belt sag between the carrying members, tension is initially reduced and the wrapping area of the belt about each of the rollers 33 and the discs 35 is increased, making belt slip less likely and further reducing tensions.

As the furnace temperatures increase, the belt 29 elongates and in prior art conveyor systems this belt elongation accumulated between discharge drum 32 and the nearest return roller 34. This accumulation interfered with load discharge from belt 29 to chute 28 and also causing increased bending and flexing of the belt in the accumulated area which precipitated early belt failure. However, by driving the return rollers 34 and by braking discharge drum 32, the belt accumulation is prevented and the belt elongation is distributed evenly between the belt carrying members. The distribution of this elongation increases the sag between the belt carrying members to increase wrapping area about each of the members, thereby lessening the possibility of belt slippage, and further reduce belt tension. Also, as the sag increases, the tension decreases and by distributing the sag along the belt, the maximum tension at any point is decreased. In prior devices, the belt tension was maintained or even increased due to the action of the take-up means.

While a particular braking means has been shown in the drawings, it is within the scope of this invention to utilize other braking means for the discharge drum 32. These other means could include the frictional resistance to drum rotation found in the journaling of the drum ends, and which for certain applications, would be sufficient in combination with the driven return rollers to prevent belt accumulation and distribute belt elongation.

The drawings and the foregoing specification constitute a description of the improved conveyor driving system in such full, clear, concise and exact terms as to enable any person skilled in the art to practice the invention, the scope of which is indicated by the appended claims.

What I claim as my invention is:

1. A furnace conveyor comprising a pair of longitudinally spaced, rotatably mounted drums, an endless conveyor belt passed around said drums to form load carrying and return conveyor strands, rotatably mounted rolls spaced between said drums to drivingly support the load carrying strand and the return conveyor strand, said load carrying strand moving from a load receiving station to a load discharge station, positive means for driving all of said load supporting rolls and all of said return supporting rolls at the same peripheral speed, and braking means on the drum at the discharge station, said braking means being independent of said poistive means and providing controlled drive opposing resistance to said belt, so that the thermal elongation of said belt is distributed between the various driven rolls and reduces belt accumulation between the discharge end drum and the nearest driven return roll, said braking means eliminating the necessity for auxiliary takeup means.

2. A furnace conveyor comprising a pair of longitudinally spaced, rotatably mounted drums, an endless conveyor belt passed around said drums to form load carrying and return conveyor strands, rotatably mounted rolls spaced between said drums to drivingly support the load carrying strand and the return conveyor strand, said load carrying strand moving from a load receiving station to a load discharge station, positive means for driving all of said load supporting rolls and all of said return supporting rolls at the same peripheral speed, said belt having an initial predetermined sag in both the load carrying strand and the return conveyor strand between said supporting rolls to provide greater wrapping area about the rolls to minimize belt tension, and braking means on the drum at the discharge station, said braking means being independent of said positive means and providing controlled drive opposing resistance to said belt, so that the thermal elongation of said belt is distributed between the various driven rolls and reduces belt accumulation between the discharge end drum and the nearest driven return roll, said braking means eliminating the necessity for auxiliary takeup means.

3. In a conveyor driving system for a heat treating furnace the combination of a heating chamber, a pair of longitudinally spaced, rotatable drums mounted entirely within said chamber on shafts supported by bearings, an endless belt conveyor passed around said drums for transferring work from a receiving station to a discharge station, said belt providing a load carrying strand and a return conveyor strand, a series of spaced rolls intermediate said drums for supporting both the load carrying strand and the return conveyor strand, positive means for simultaneously rotating all of said rolls at equal velocity to drive said belt which in turn drives said drums, and braking means on the drum at the discharge station, said braking means being mounted independently of said positive means and providing controlled drive opposing resistance to movement of said belt so that the thermal elongation of said belt is distributed between the driven rolls, said braking means supplementing the inherent braking action caused by friction on the drum shaft bearings.

4. In a conveyor driving system for a heat treating furnace the combination of a heating chamber, a pair of longitudinally spaced, rotatable drums mounted entirely within said chamber on shafts supported by bearings, an endless belt conveyor passed around said drums for transferring work from a receiving station to a discharge station, said belt providing a load carrying strand and a return conveyor strand, a series of spaced rolls intermediate said drums for supporting both the load carrying strand and the return conveyor strand, positive means for simultaneously rotating all of said rolls at equal velocity to drive said belt which in turn drives said drums, said belt having an initial predetermined sag in both the load carrying strand and the return conveyor strand between said supporting rolls to provide greater wrapping area about the rolls to minimize belt tension, and braking means on the drum at the discharge station, said braking means being mounted independently of said positive means and providing controlled drive opposing resistance to movement of said belt so that the thermal elongation of said belt is distributed between the driven rolls, said braking means supplementing the inherent braking action caused by friction on the drum shaft bearings.

References Cited in the file of this patent

UNITED STATES PATENTS

| | | |
|---|---|---|
| 1,696,822 | Tytus | Dec. 25, 1928 |
| 1,858,484 | Cooley | May 17, 1932 |
| 1,880,954 | Fahrenwald | Oct. 4, 1932 |
| 2,663,404 | Petterson et al. | Dec. 22, 1953 |
| 2,780,454 | Martin | Feb. 4, 1957 |